United States Patent [19]
Kishi

[11] Patent Number: 5,563,662
[45] Date of Patent: Oct. 8, 1996

[54] IMAGE SIGNAL COMPRESSING AND EXPANSION WITH FILTER MEANS TO ELIMINATE BLOCKING EFFECT

[75] Inventor: Kenji Kishi, Yokohama, Japan

[73] Assignee: Olympus Optical Co., Ltd., Tokyo, Japan

[21] Appl. No.: 237,378

[22] Filed: May 3, 1994

[30] Foreign Application Priority Data

May 11, 1993 [JP] Japan ..................... 5-109258

[51] Int. Cl.⁶ ..................................................... H04N 7/24
[52] U.S. Cl. ........................................................ 348/420
[58] Field of Search ................................... 348/420, 421, 348/416, 415, 409, 402, 401, 400, 390, 384; 358/433; 382/56

[56] References Cited

U.S. PATENT DOCUMENTS

| | | | |
|---|---|---|---|
| 4,754,492 | 6/1988 | Malvar | 348/403 |
| 4,941,043 | 7/1990 | Jass | 348/404 |
| 5,311,310 | 5/1994 | Jozawa et al. | 348/416 |
| 5,351,083 | 9/1994 | Tsukagoshi | 348/403 |
| 5,384,849 | 1/1995 | Jeong | 348/404 |

OTHER PUBLICATIONS

Malvar et al, "The LOT: Transform Coding Without Blocking Effects," *IEEE Transactions on Acoustics, Speech, and Signal Processing*, vol. 37, No. 4, Apr. 1989.

*Primary Examiner*—Tommy P. Chin
*Assistant Examiner*—Bryan S. Tung
*Attorney, Agent, or Firm*—Frishauf, Holtz, Goodman, Langer & Chick

[57] ABSTRACT

A raster/block converting section converts an input raster image signal into a block scan signal. A compressing/coding section selectively compresses and codes one of the block scan signal, converted by the raster/block converting section, and a differential signal. An expanding/decoding section expands and decodes the block scan signal compressed and coded by the compressing/coding section. A block/raster converting section converts the block scan signal, expanded and decoded by the expanding/decoding section, into a raster signal. A filter section filters the raster signal, converted by the block/raster converting section, to remove deformation at a boundary between blocks. A differentiating section substantially obtains a difference between the raster signal filtered by the filter section and the input raster image signal and supplies the difference as the differential signal to the compressing/coding section.

9 Claims, 6 Drawing Sheets

IMAGE SIGNAL COMPRESSING AND EXPANSION WITH FILTER MEANS TO ELIMINATE BLOCKING EFFECT

BACKGROUND OF THE INVENTION

1. Field of the Invention

The present invention relates to an image signal compressing and coding apparatus, and, more particularly, to an image signal compressing and coding apparatus which is adapted for use in an image processing apparatus that uses digital moving images.

2. Description of the Related Art

Recently, various techniques for compressing and coding moving images at high efficiency have been studied and developed for moving image processing apparatuses which process moving image signals typified by color TV signals.

The conventional coding schemes involving the compression of moving images typically use a frame (I) for intraframe coding and a frame (P) for interframe differential (compression) coding (hereinafter referred to as "interframe coding frame") in mixture along the time axis, as shown in FIG. 5. The interframe coding is a very effective compressing scheme when the correlation between frames is high. That is, intraframe coding frames are inserted between a plurality of interframe coding frames to improve the compressing efficiency and minimize the disturbance of images even if some images are dropped off.

A conventional moving image processing apparatus will now be described with reference to FIG. 6.

In FIG. 6, an image signal in a raster signal (not shown), which is output from an image input device, is converted into a block scan signal by a raster/block converter 1. The processing carried out at the subsequent stages of this raster/block converter 1 differs between the intraframe coding frame and the interframe coding frame. To begin with, the processing for the intraframe coding frame will be discussed.

The image signal, which has been converted into a block scan signal, is input to a DCT (Discrete Cosine Transform) circuit 5 via a data selector 4 to be converted into a DCT coefficient. This DCT coefficient is subjected to quantization and Hoffman coding by an encoder 6 based on a previously prepared quantization table, and the resultant data is stored in a code memory 7. One frame of data stored in the code memory 7 is read out as a compressed file to an unillustrated, external storage device (hard disk, tape streamer, magneto-optical storage device, or the like) and is also input to a decoder 8.

This decoder 8 performs Hoffman decoding and inverse quantization to generate a DCT coefficient. The DCT coefficient is input to an IDCT (Inverse Discrete Cosine Transform) circuit 9 to be converted into image data. The converted image data is sent to an adder 11, which reconstructs the original image from the differential frame for an interframe coding frame. In the case of the intraframe coding frame, "0" is selected by a data selector 10 so that the output of the adder 11 does not change.

The output of the adder 11 is written in a frame memory 12 and is also input to a data selector 2 through which the output is sent to a differentiating circuit 3.

The processing for the interframe coding frame will now be described. The image signal, which has been converted into a block scan signal by the raster/block converter 1, is input to the differentiating circuit 3 to obtain the difference between this block scan signal and the image signal from the data selector 2, which has been compressed or expanded by the intraframe coding in the above-described manner. The resultant image data is then sent to the DCT circuit 5 via the data selector 4 to be converted into a DCT coefficient. The DCT coefficient is subjected to quantization and Hoffman coding by the encoder 6 based on the previously prepared quantization table and the resultant data is stored in the code memory 7.

One frame of data stored in the code memory 7 is read out to the unillustrated, external storage device and is input to the decoder 8 at the same time. This decoder 8 performs Hoffman decoding and inverse quantization to generate a DCT coefficient. The DCT coefficient is input to the IDCT circuit 9 to be converted into image data. The converted differential image data is sent to the adder 11, which adds this data and the image data of the previous frame together to reconstruct the original image. The image data of the previous frame from the frame memory 12 is selected by the data selector 10. The output of the adder 11 is written into the frame memory 12 and is input to the data selector 2 simultaneously. The subsequent frames will be processed in the above-described procedures.

The data selector 2 selects "0" only when the first frame is coded, and selects the output of the adder 11 thereafter.

The decoding procedures will now be discussed. Coded data is read from the unillustrated external storage device and is buffered by the code memory 7. The data is then input to the decoder 8 to be subjected to Hoffman decoding and inverse quantization, so that a DCT coefficient is generated. This DCT coefficient is input to the IDCT circuit 9 to be converted to image data, which is then sent to the adder 11.

In the case for the intraframe coding frame, "0" is selected by the data selector 10, so that the output of the adder 11 does not change. For the interframe coding frame, image data of the previous frame stored in the frame memory 12 is selected by the data selector 10 and is added to the differential image data by the adder 11. The output of the adder 11 is converted into a raster signal by a block/raster converter 13 and is output therefrom as an image signal.

The data selector 4 selects the output of the raster/block converter 1 only when the first frame is coded, and selects the output of the differentiating circuit 3 thereafter.

Since the prior art performs image expansion in the image compressing process and uses a differential frame obtained from the expanded image data, the image expanding process should also be executed at the time the image compressing process is carried out.

As the compressing and expanding processes in the prior art are all executed with block scan signals, an FIR (Finite Impulse Response) filter, which serves as a low-pass filter whose filtering amount changes substantially in accordance with the spatial frequency band to eliminate deformation, cannot be used at the time of effecting the filtering to eliminate the distortion of the boundary between blocks as disclosed in U.S. patent application Ser. No. 813,798 (replaced with contination application Ser. No. 08/238,983) that was filed by the same assignee as that of this application.

Further, because the filtering algorithm for moving images differs from that for still picture images, the prior art requires different circuits to perform compression/expansion for moving images and compression/expansion for still picture images.

In addition, it is difficult in the prior art to monitor the statuses of the compression of moving images or still picture images, the filtering coefficients, and the compression-oriented deterioration of images.

SUMMARY OF THE INVENTION

It is therefore an object of the present invention to provide a new and improved image signal compressing and coding apparatus which does not require different circuits to perform compression/expansion for moving images and compression/expansion for still picture images, and which allows the statuses of the compression of moving images or still picture images, the filtering coefficients and the compression-oriented deterioration of images to be easily monitored.

According to one aspect of the present invention, there is provided an image signal compressing and coding apparatus which comprises a raster/block converting section for converting an input raster image signal into a block scan signal; a compressing/coding section for selectively compressing and coding one of the block scan signal, converted by the raster/block converting section, and a differential signal; an expanding/decoding section for expanding and decoding the block scan signal compressed and coded by the compressing/coding section; a block/raster converting section for converting the block scan signal, expanded and decoded by the expanding/decoding section, into a raster signal; a filter section for filtering the raster signal, converted by the block/raster converting section, to remove deformation at a boundary between blocks; and a differentiating section for substantially obtaining a difference between the raster signal filtered by the filter section and the input raster image signal and supplying the difference as the differential signal to the compressing/coding section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENT

Figure 1:
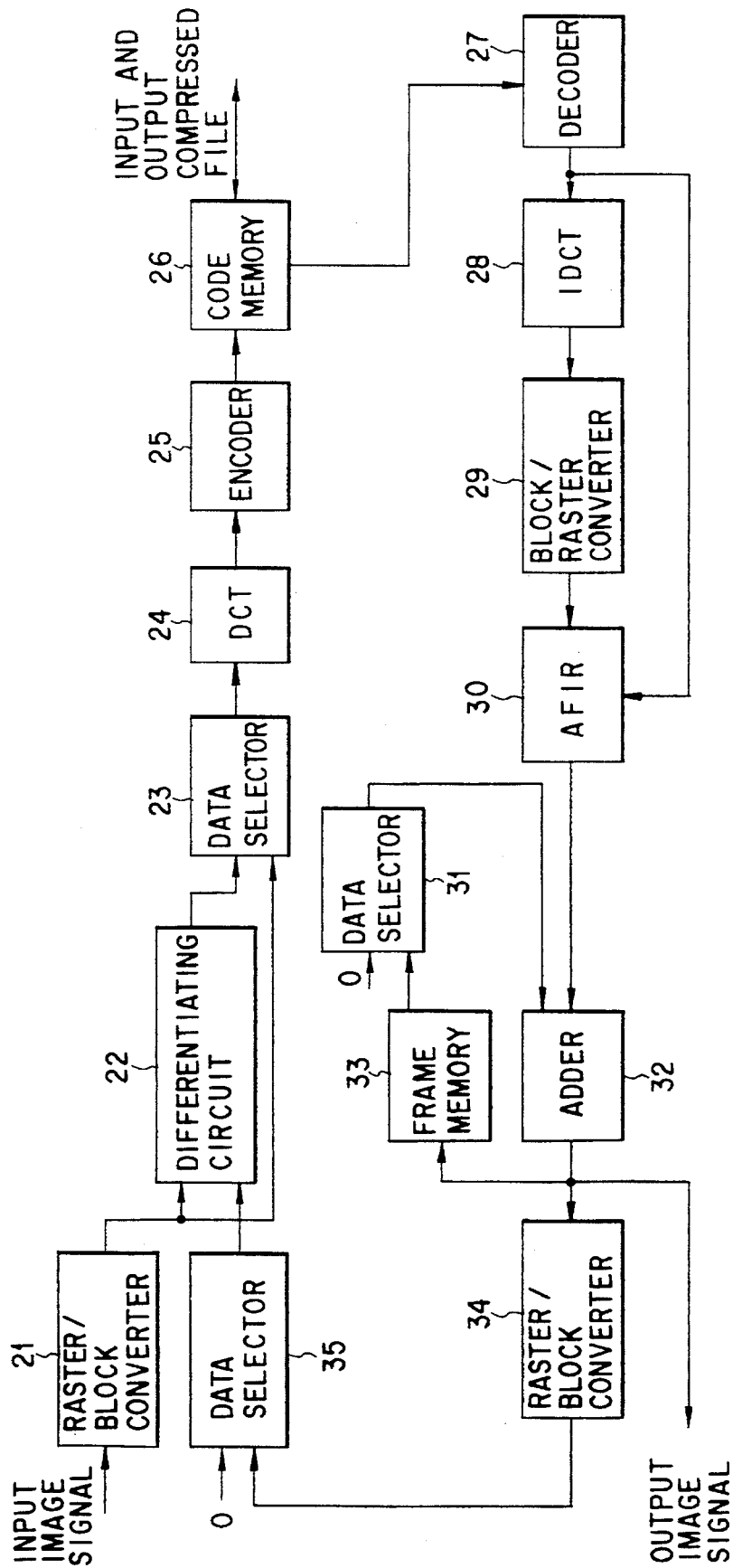
FIG. 1 is a block diagram illustrating a moving image coding apparatus according to a first embodiment of the present invention in which a filter for removing distortion at the boundary between blocks of a compressed image is adapted in the compression of moving images.

Reference will now be made in detail to the presently preferred embodiments of the invention as illustrated in the accompanying drawings, in which like reference characters designate like or corresponding parts through the several drawings.

Several embodiments of the present invention will now be explained with reference to the accompanying drawings.

FIG. 1 illustrates a first embodiment of the present invention in which a filter for removing distortion at the boundary between blocks of a compressed image is adapted in the compression of moving images. The following description will discuss the structure of the processing circuit, and the algorithm for the distortion removing filter is disclosed in the aforementioned U.S. patent application Ser. No. 813,798, (replaced with continuation application Ser. No. 08/238,983) filed by the same assignee as that of this application, and is thus incorporated herein by reference and its description will not be given.

In FIG. 1, an image signal from an image input device (not shown), which has been input to a raster/block converter 21, is converted into a block scan signal, which is in turn input to a data selector 23 directly and via a differentiating circuit 22. Then, image data which has been converted to a DCT coefficient by a DCT circuit 24 is subjected to quantization and Hoffman coding by an encoder 25, and the resultant data is stored as a compressed file in a code memory 26. This code memory 26 exchanges a compressed file with an unillustrated, external storage device (hard disk, tape streamer, magneto-optical storage device, or the like).

One frame of data stored in the code memory 26 is subjected to Hoffman decoding and inverse quantization by a decoder 27, yielding a DCT coefficient. The DCT coefficient is input to an IDCT circuit 28 to be converted into image data. The converted image data is converted into a raster signal by a block/raster converter 29, and is then sent together with the output of the decoder 27, the DCT coefficient, to an adaptive convolution filter (AFIR) 30. The output of this adaptive convolution filter 30 is input together with the output of a data selector 31 to an adder 32. The output of the adder 32 is supplied to a frame memory 33 and to a raster/block converter 34. The raster/block converter 34 converts the received data into a block scan signal, which in turn is input via a data selector 35 to a differentiating circuit 22.

Figure 5:
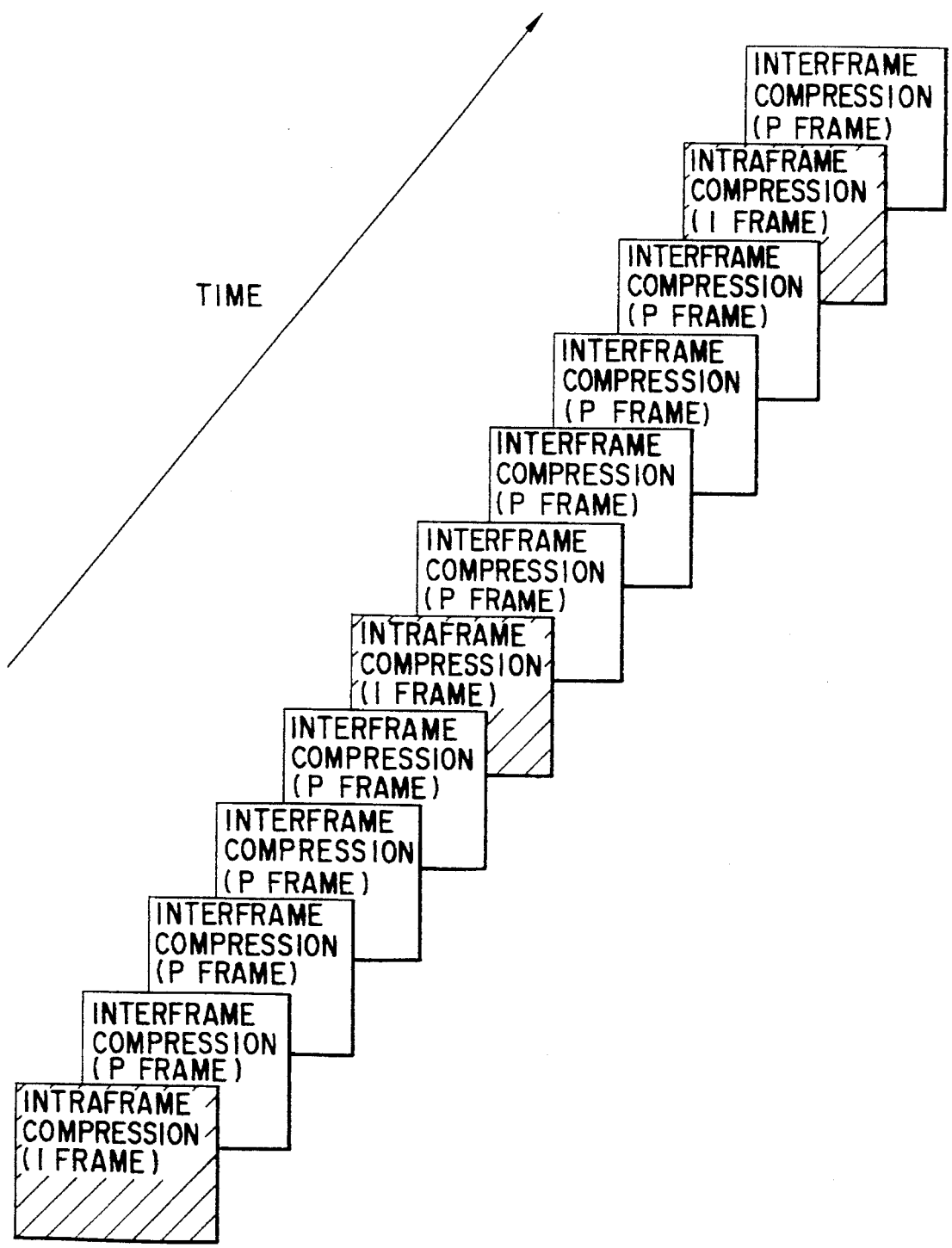
FIG. 5 is a diagram showing the structure of a frame in a conventional coding method for compressing moving images.
Figure 6:
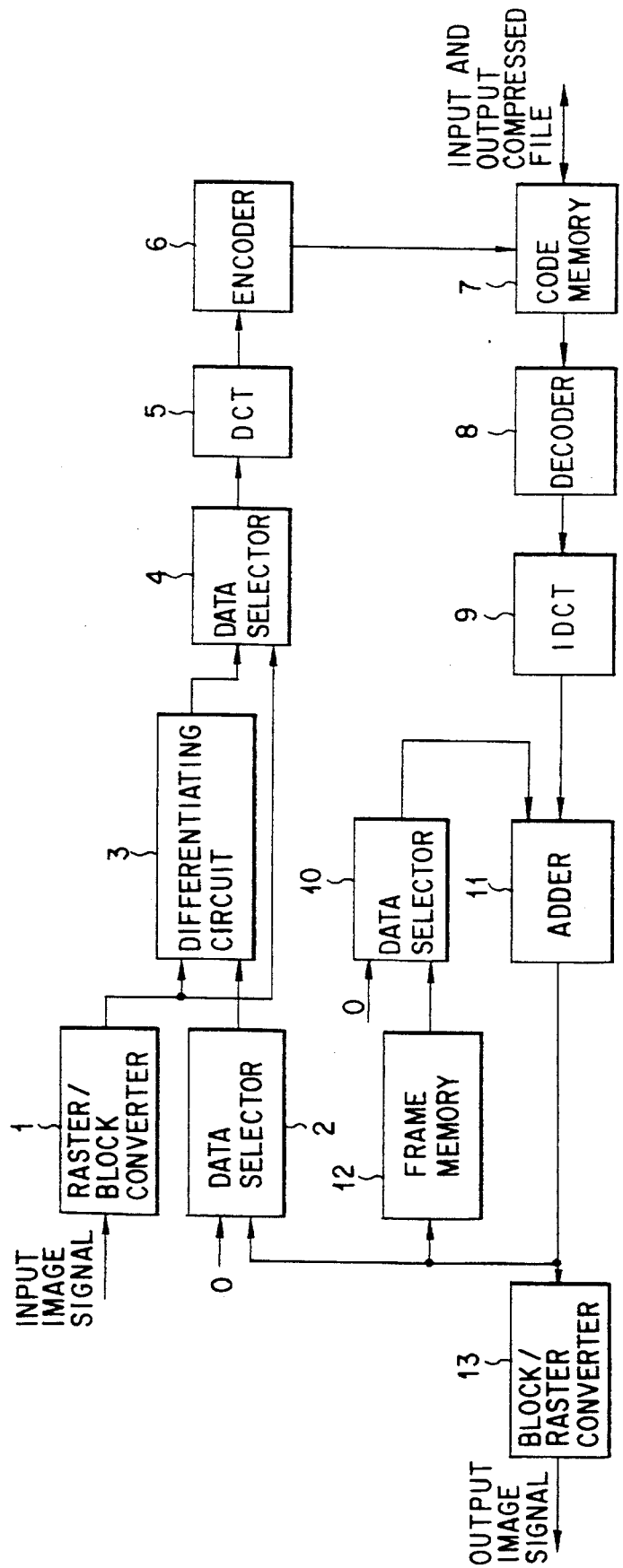
FIG. 6 is a block diagram illustrating a conventional moving image processing apparatus.

With the above structure, a raster image signal which is output from an image input device (not shown), is converted into a block scan signal by a raster/block converter 21. As shown in FIG. 5, the image is structured such that a plurality of interframe coding frames are placed between adjoining intraframe coding frames.

Since the processing carried out for the intraframe coding frame differs from the processing for the interframe coding frame, the processing for the intraframe coding frame will be discussed first.

The image signal, which has been converted into a block scan signal by the raster/block converter 21, is input to the DCT circuit 24 via the data selector 23 to be converted into a DCT coefficient. This DCT coefficient is subjected to quantization and Hoffman coding by the encoder 25 based on a previously prepared quantization table, and the resultant data is stored in the code memory 26. One frame of data stored in the code memory 26 is read out to an unillustrated, external storage device (hard disk, tape streamer, magneto-optical storage device, or the like) and is also input to the decoder 27. This decoder 27 performs Hoffman decoding and inverse quantization to generate a DCT coefficient.

The DCT coefficient is input to the IDCT circuit 28 to be converted into image data. The converted image data is sent to the block/raster converter 29 to be converted into a raster signal. The converted raster image signal is filtered by the adaptive convolution filter 30. The coefficient or frequency response of this adaptive convolution filter 30 is determined by the DCT coefficient output from the decoder 27. The differential image signal from which distortion at the boundary between blocks has been removed by the adaptive convolution filter 30 is input to the adder 32.

The adder 32 reconstructs the original image from the differential frame for an interframe coding frame. In the case of the intraframe coding frame, "0" is selected by the data selector 31 so that the output of the adder 32 does not change. The output of the adder 32 is written in the frame memory 33 and is also input to the raster/block converter 34 to be converted into a block scan signal. This block scan signal is then sent via the data selector 35 to the differentiating circuit 22.

The data selector 35 selects "0" only when the first frame is coded, and selects the output of the raster/block converter 34 thereafter. This is the same for the case of coding the interframe coding frame and other embodiments, which will be discussed later.

The data selector 23 selects the output of the raster/block converter 21 only when the first frame is coded, and selects the output of the differentiating circuit 22 thereafter. This is the same for the case of coding the interframe coding frame and other embodiments, which will be discussed later.

The processing for the interframe coding frame will now be described.

The image signal, which has been converted into a block scan signal by the raster/block converter 21, is input to the differentiating circuit 22 to obtain the difference between this block scan signal and the image signal from the data selector 35, which has been compressed or expanded by the intraframe coding in the above-described manner. The resultant image data is then sent to the DCT circuit 24 via the data selector 23 to be converted into a DCT coefficient. The DCT coefficient is subjected to quantization and Hoffman coding by the encoder 25 based on the previously prepared quantization table and the resultant data is stored in the code memory 26. One frame of data stored in the code memory 26 is read out to the unillustrated, external storage device and is input to the decoder 27 at the same time. This decoder 27 performs Hoffman decoding and inverse quantization to generate a DCT coefficient.

The DCT coefficient is input to the IDCT circuit 28 to be converted into image data. The converted image data is sent to the block/raster converter 29 to be converted into a raster signal. The converted raster image signal is filtered by the adaptive convolution filter 30. The coefficient or frequency response of this adaptive convolution filter 30 is determined by the DCT coefficient output from the decoder 27.

The differential image signal from which distortion at the boundary between blocks has been removed by the adaptive convolution filter 30 is input to the adder 32. The image data of the previous frame stored in the frame memory 33 is selected by the data selector 31 and is added to the differential image signal by the adder 32. The raster/block converter 34 converts the output of the adder 32 into a raster signal which is then input to the data selector 35.

The subsequent frames will be processed in the above-described procedures.

The decoding procedures will now be discussed.

Coded data is read from the external storage device and is buffered by the code memory 26. The data is then input to the decoder 27 which performs Hoffman decoding and inverse quantization on that data, generating a DCT coefficient. This DCT coefficient is input to the IDCT circuit 28 to be converted to image data, which is then sent to the block/raster converter 29 to be converted into a raster signal. The raster image signal is then filtered by the adaptive convolution filter 30.

The coefficient or frequency response of this adaptive convolution filter 30 is determined by the DCT coefficient output from the decoder 27. The image signal from which distortion at the boundary between blocks has been removed by the adaptive convolution filter 30 is input to the adder 32. In the case of the intraframe coding frame, the data selector 31 selects "0" so that the output of the adder 32 does not change. For the interframe coding frame, image data of the previous frame stored in the frame memory 33 is selected by the data selector 31 and is added to the differential image data by the adder 32. The resultant data is output as a decoded image signal and is written again in the frame memory 33.

Figure 2:
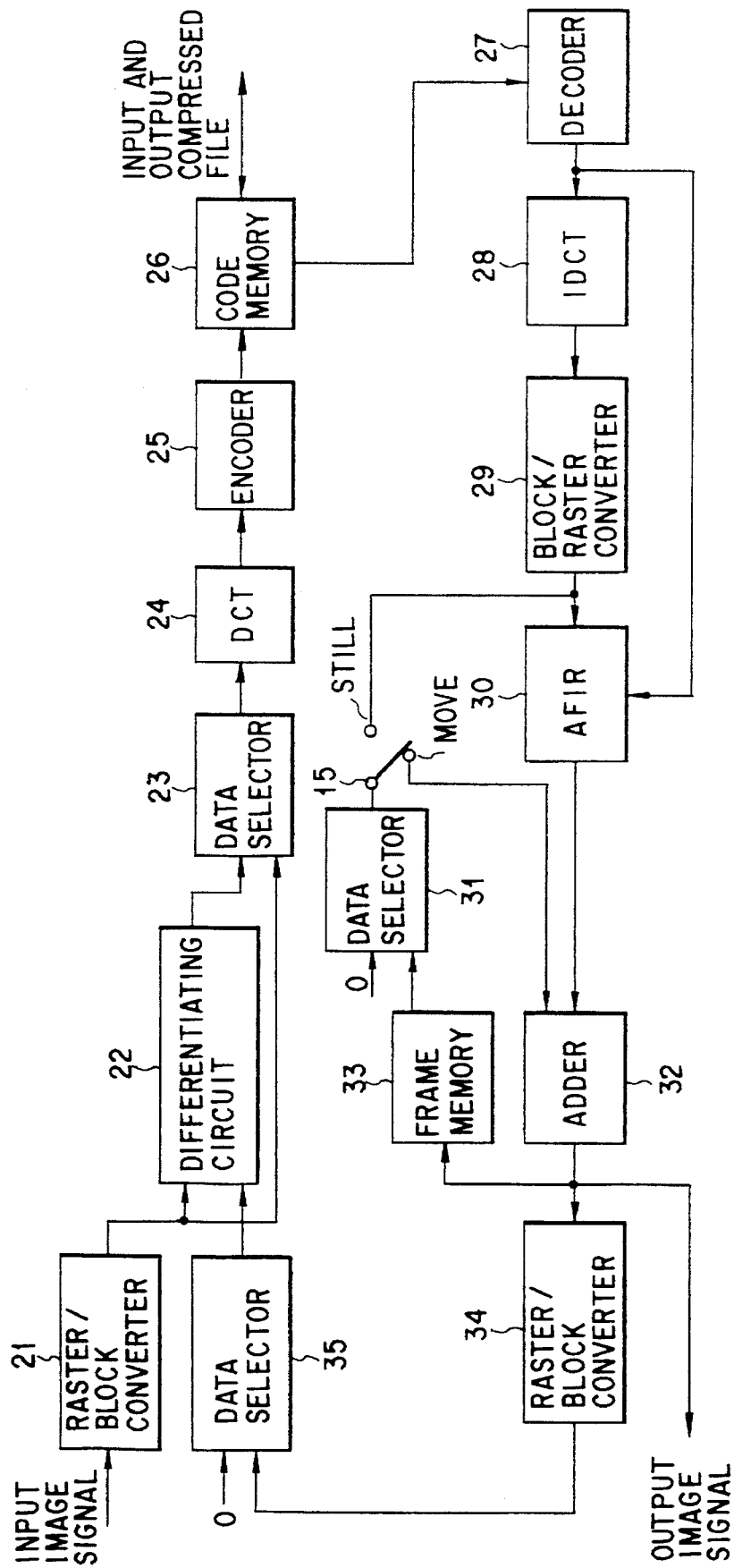
FIG. 2 is a block diagram illustrating a second embodiment of the present invention in which a filter for removing distortion at the boundary between blocks of a compressed image is adapted in the compression of moving images and still picture images.

FIG. 2 illustrates a second embodiment of the present invention in which a filter for removing distortion at the boundary between blocks of a compressed image is adapted in the compression of moving images and still picture images. Since the processing for the moving images is the same as that in the first embodiment if a switch 15 is set to the "Move" side, its description will be omitted and the processing for the still picture images will be discussed below.

The coding of still picture images will be explained below.

In FIG. 2, the image signal, which has been converted into a block scan signal by the raster/block converter 21, is input to the DCT circuit 24 via the data selector 23 to be converted into a DCT coefficient. This DCT coefficient is subjected to quantization and Hoffman coding by the encoder 25 based on a previously prepared quantization table, and the resultant data is stored in the code memory 26. One frame of data stored in the code memory 26 is read out to an unillustrated, external storage device (hard disk, tape streamer, magneto-optical storage device, or the like).

The decoding of still picture images will now be discussed.

Coded data is read from the external storage device (not shown) and is buffered by the code memory 26. The data is then input to the decoder 27 which performs Hoffman decoding and inverse quantization on that data, generating a DCT coefficient. This DCT coefficient is input to the IDCT circuit 28 to be converted to image data, which is then sent to the block/raster converter 29 to be converted into a raster signal. The raster image signal is then filtered by the adaptive convolution filter 30.

The coefficient or frequency response of this adaptive convolution filter 30 is determined by the DCT coefficient output from the decoder 27. The image signal from which distortion at the boundary between blocks has been removed by the adaptive convolution filter 30 is input to the adder 32. In this case, as the data selector 31 selects "0," the output of the adder 32 does not change and is stored as one screen of image data in the frame memory 33.

When one frame of image data is stored in the frame memory 33, the vertical component of the memory content is read from the frame memory 33 and is input again to the adaptive convolution filter 30 via the "Still" side of the switch 15. This vertical component is filtered with the previously stored vertical filter coefficient. The resultant image signal is input to the adder 32. As the data selector 31 selects "0," the output of the adder 32 does not change and is stored again in the frame memory 33. After one frame of image data is stored in the frame memory 33, the horizontal component of the stored data is read from the frame memory 33 and is processed in the same manner as the vertical component. The resultant data is then output as an image signal.

The structure of the second embodiment can perform processes respectively suitable for moving images and still picture images in the same system. That is to say, the structure of the second embodiment can perform filtering only the horizontal component so as to process with high speed for the moving images, and can perform filtering both of the horizontal and vertical components to obtain high quality images for the still picture images.

Figure 3:
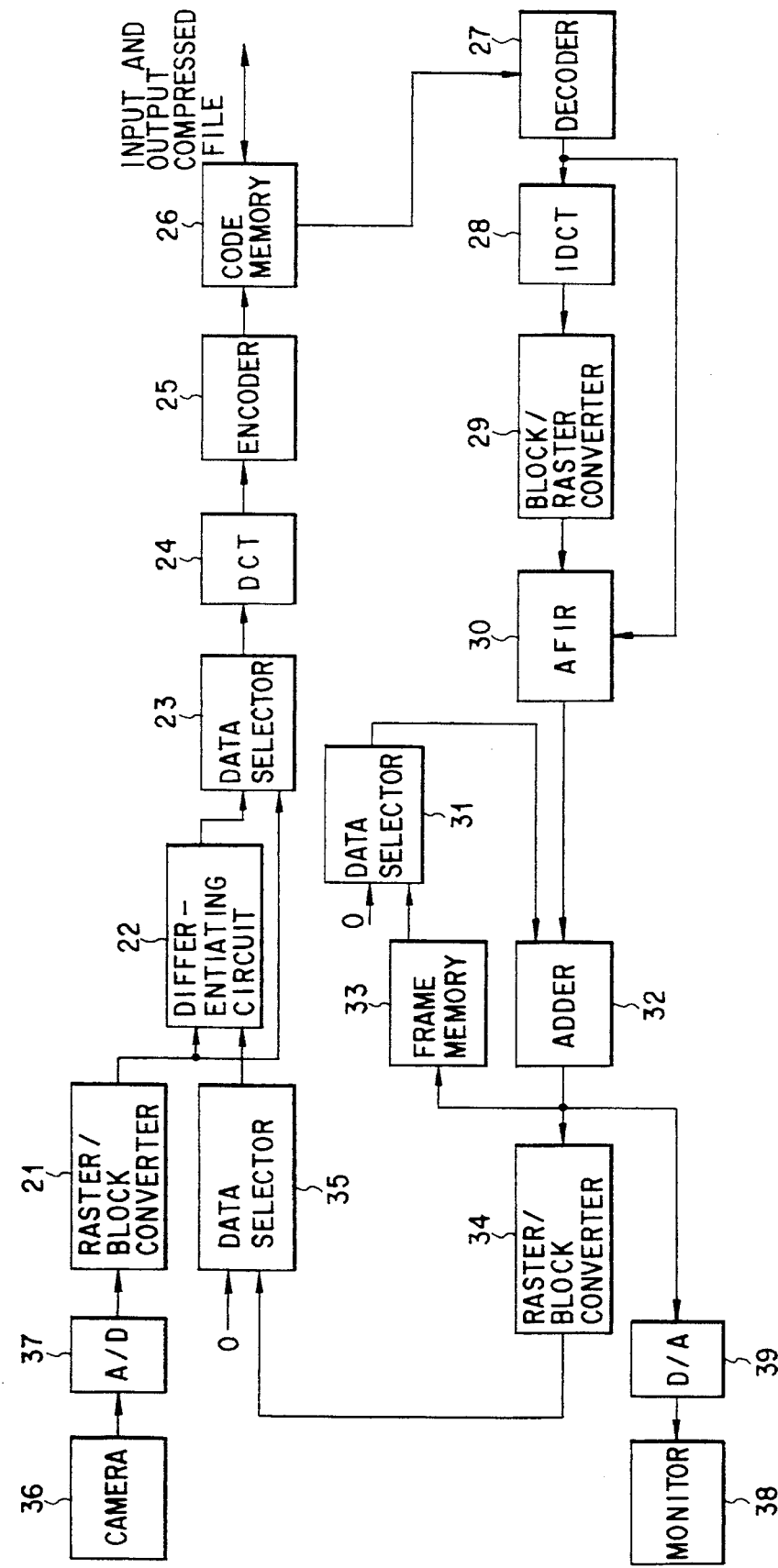
FIG. 3 is a block diagram illustrating a third embodiment of the present invention in which a filter for removing distortion at the boundary between blocks of a compressed image is adapted in the compression of moving images.

FIG. 3 illustrates a third embodiment of the present invention in which a filter for removing distortion at the boundary between blocks of a compressed image is adapted in the compression of moving images.

In FIG. 3, an analog image signal as a raster image signal, which is output from an image input device, e.g., a camera 36, is converted into a digital image signal by an A/D converter 37. The digital raster image signal is then converted into a block scan signal by the raster/block converter 21.

A description will be given of the intraframe coding frame first.

The image signal, which has been converted into a block scan signal, is input to the DCT circuit 24 via the differentiating circuit 22 (to be described later) and the data selector 23 for conversion into a DCT coefficient. This DCT coefficient is subjected to quantization and Hoffman coding by the encoder 25 based on a previously prepared quantization table, and the resultant data is stored in the code memory 26. One frame of data stored in the code memory 26 is read out to an unillustrated, external storage device (hard disk, tape streamer, magneto-optical storage device, or the like) and is also input to the decoder 27. This decoder 27 performs Hoffman decoding and inverse quantization to generate a DCT coefficient. The DCT coefficient is input to the IDCT circuit 28 to be converted into image data.

The converted image data is sent to the block/raster converter 29 to be converted into a raster signal. The converted raster image signal is filtered by the adaptive convolution filter 30. The coefficient or frequency response of this adaptive convolution filter 30 is determined by the DCT coefficient output from the decoder 27.

The differential image signal from which distortion at the boundary between blocks has been removed by the adaptive convolution filter 30 is input to the adder 32. The adder 32 reconstructs the original image from the differential frame for an interframe coding frame. In the case of the intraframe coding frame, "0" is selected by the data selector 31 so that the output of the adder 32 does not change.

The output of the adder 32 is written in the frame memory 33 and is supplied to a D/A converter to be converted into an analog image signal. The analog image signal is then sent to a monitor 38. The output of the adder 32 is also input to the raster/block converter 34 to be converted into a block scan signal, which is then sent via the data selector 35 to the differentiating circuit 22.

The interframe coding frame will be processed as follows.

The image signal, which has been converted into a block scan signal by the raster/block converter 21, is input to the differentiating circuit 22 to obtain the difference between this block scan signal and the image signal from the data selector 35, which has been compressed or expanded by the intraframe coding in the above-described manner. The resultant image data is then sent to the DCT circuit 24 via the data selector 23 to be converted into a DCT coefficient. The DCT coefficient is subjected to quantization and Hoffman coding by the encoder 25 based on the previously prepared quantization table and the resultant data is stored in the code memory 26.

One frame of data stored in the code memory 26 is read out to the unillustrated, external storage device and is input to the decoder 27 at the same time. This decoder 27 performs Hoffman decoding and inverse quantization to generate a DCT coefficient. The IDCT circuit 28 to which this DCT coefficient is input converts the DCT coefficient into differential image data. The converted differential image data is sent to the block/raster converter 29 to be converted into a raster signal.

The converted raster differential image signal is filtered by the adaptive convolution filter 30. The coefficient or frequency response of this adaptive convolution filter 30 is determined by the DCT coefficient output from the decoder 27. The differential image signal from which distortion at the boundary between blocks has been removed by the adaptive convolution filter 30 is input to the adder 32. The image data of the previous frame stored in the frame memory 33 is selected by the data selector 31 and is added to the differential image signal by the adder 32.

The raster/block converter 34 converts the output of the adder 32 into a raster signal which is then input to the data selector 35. The output of the adder 32 is also written in the frame memory 33 and is sent to the D/A converter 39. The D/A converter 39 converts the received data into an analog image signal which is then output to the monitor 38.

The subsequent frames will be processed in the above-described procedures.

The structure of the third embodiment allows a compressed (expanded) image to be monitored in real time. For example, as the filter or the like for removing distortion at the boundary between blocks often depends on the image to be processed, the proper filter coefficient can be selected by changing the intensity of the filter while monitoring the image.

Figure 4:
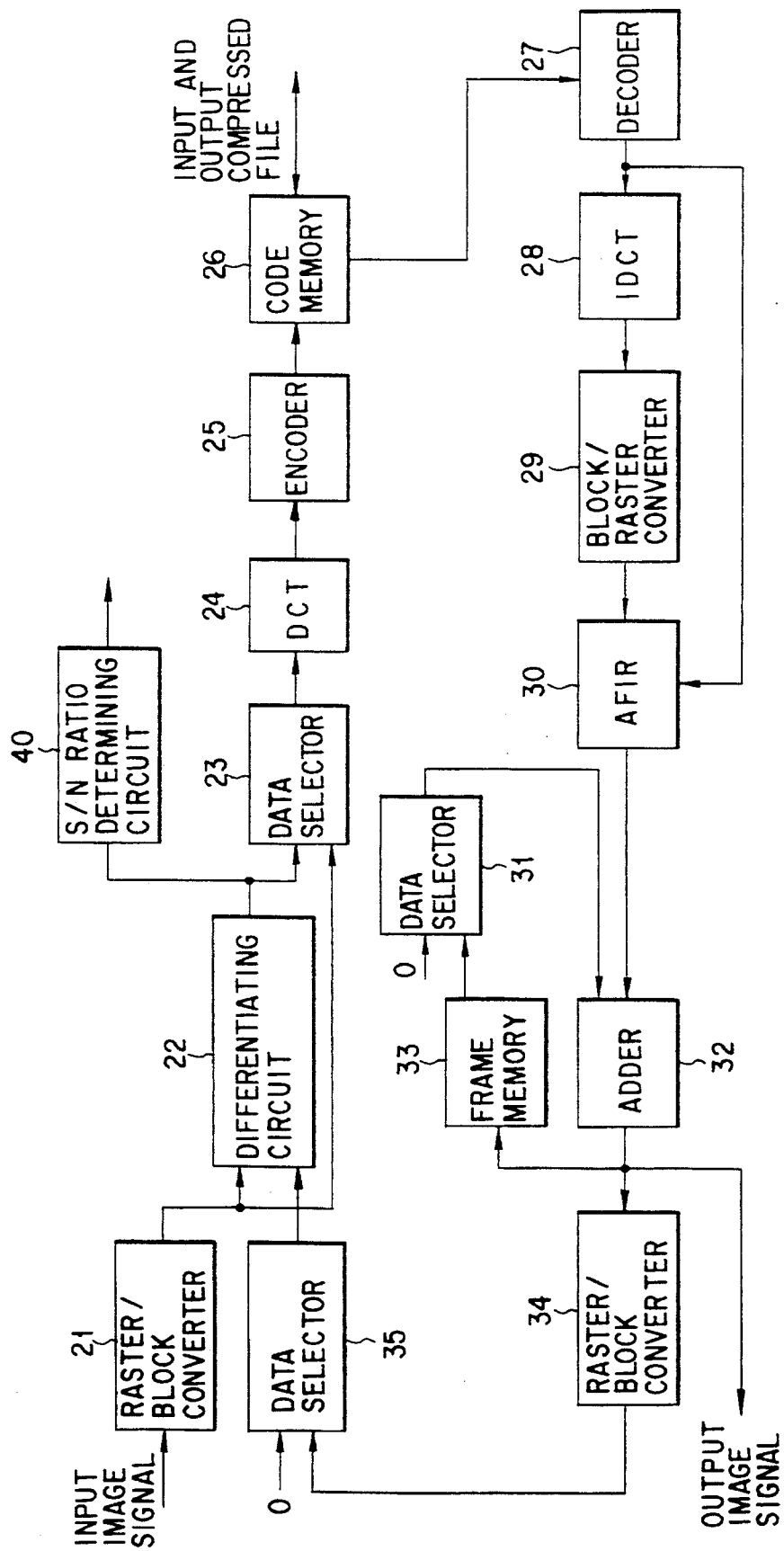
FIG. 4 is a block diagram illustrating a fourth embodiment of the present invention in which a filter for removing distortion at the boundary between blocks of a compressed image is adapted in the compression of moving images and still picture images.

FIG. 4 illustrates a fourth embodiment of the present invention in which a filter for removing distortion at the boundary between blocks of a compressed image is adapted in the compression of moving images and still picture images. Since the processing for the moving images is the same as that in the above-described first embodiment, its description will be omitted and the processing for the still picture images will be discussed below.

The coding of still picture images will be explained below. In FIG. 4, the image signal, converted into a block scan signal by the raster/block converter 21, is input to the DCT circuit 24 via the differentiating circuit 22, which will be discussed later, and the data selector 23 to be converted into a DCT coefficient. This DCT coefficient is subjected to quantization and Hoffman coding by the encoder 25 based on a previously prepared quantization table, and the resultant data is stored in the code memory 26.

One frame of data stored in the code memory 26 is read out to an unillustrated, external storage device (hard disk, tape streamer, magneto-optical storage device, or the like) and is also input to the decoder 27. This decoder 27 performs Hoffman decoding and inverse quantization to generate a DCT coefficient. The DCT coefficient is input to the IDCT circuit 28 to be converted into image data. The converted image data is sent to the block/raster converter 29 to be converted into a raster signal.

The converted raster image signal is filtered by the adaptive convolution filter 30. The coefficient or frequency response of this adaptive convolution filter 30 is determined by the DCT coefficient output from the decoder 27. The image signal from which distortion at the boundary between blocks has been removed by the adaptive convolution filter 30 is input to the adder 32. Since "0" is selected by the data selector 31, the output of the adder 32 does not change and is converted into a raster signal by the raster/block converter 34. The raster signal is then input to the data selector 35. The signal selected by the data selector 35 is input to the differentiating circuit 22 to obtain the difference between the image data of the previous frame and the image data of the current frame. This differential signal is input to an S/N ratio determining circuit 40 to obtain data on the S/N ratio.

In this processing, the coefficient or the frequency response of the adaptive convolution filter 30 is altered to select an image with the maximum S/N ratio and this coefficient is written in the header or the like of the image data. The distortion at the boundary between blocks is filtered out with this filter coefficient at the time of image reproduction, thereby providing the best image.

According to the fourth embodiment, since additional information is simply set in the header or the like and the actual data is not affected, the image data can be expanded by a reproducing apparatus which is not equipped with a filter for removing the distortion at the boundary between blocks.

This embodiment has another advantage that most of the circuit structure is also used to process moving images, preventing the number of circuits from increasing.

The structures of the above-described embodiments may of course be modified or changed. For instance, various image processing filters, such as a block distortion removing filter and a mosquito noise removing filter, may be used for the filter which removes the distortion at the boundary between blocks.

According to the present invention, as described above, it is possible to provide a moving image coding apparatus, which does not require different circuits to perform compression/expansion for moving images and compression/expansion for still picture images, and which allows the statuses of the compression of moving images or still picture images, the filtering coefficients and the compression-oriented deterioration of images to be easily monitored. Further, the filter coefficient for a still picture image can be obtained using the section that processes moving images.

Additional embodiment of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An image signal compressing and coding apparatus comprising:

raster/block converting means for converting an input raster image signal into a block scan signal;

compressing/coding means for selectively compressing and coding one of said block scan signal, converted by said raster/block converting means, and a differential signal:

expanding/decoding means, coddled to said compressing/coding means, for expanding and decoding said block scan signal compressed and coded by said compressing/coding means:

block/raster converting means, coupled to said expanding/decoding means, for converting said block scan signal, expanded and decoded by said expanding/decoding means, into a raster scan signal;

filter means, coupled to said block/raster converting means, for filtering said raster scan signal, converted by said block/raster converting means, to remove deformation at a boundary between blocks; and differentiating means for determining whether said input raster image signal is based on a still picture image or on a moving image, and including means for:

when the input raster image signal is determined to be based on a still picture image, after said raster scan signal is input into said filter means so as to be filtered again by said filter means, substantially obtaining a difference between said filtered raster signal and said input raster image signal such that the difference is supplied as said differential signal to said compressing/coding means, and when the input raster image signal is determined to be based on a moving image, substantially obtaining a difference between said filtered raster signal and said input raster image signal such that the difference is supplied as said differential signal to said compressing/coding means;

wherein said compressing/coding means includes a first data selector for selecting said block scan signal only when a first frame is coded, and for selecting said differential signal thereafter;

said differentiating means includes a further data selector for selecting "0" at a time of coding a first frame and for selecting an output of a second raster/block converting means thereafter, and a differentiating circuit for obtaining a difference between an output of said further data selector and said output of said second raster/block covering means; and said block/raster converting means, said compression/coding means, and said data selectors are coupled together in a compression/expansion processing loop.

2. The image signal compressing and coding apparatus according to claim 1, wherein said compressing/coding means includes a discrete cosine transform (DCT) circuit for converting an output from said data selector into a DCT coefficient, an encoder for performing quantization and Hoffman coding on said DCT coefficient from said DCT circuit, and a code memory for storing an output of said encoder.

3. The image signal compressing and coding apparatus according to claim 2, wherein said expanding/decoding means includes a decoder for performing Hoffman decoding and inverse quantization on an output of said code memory to produce a DCT coefficient, and an inverse discrete cosine transform circuit for converting said DCT coefficient from said decoder into a block scan image signal.

4. The image signal compressing and coding apparatus according to claim 3, wherein said filter means includes an adaptive convolution filter whose frequency response is determined by said DCT coefficient from said decoder.

5. The image signal compressing and coding apparatus according to claim 1, wherein said differentiating means further includes:

a frame memory for storing an output of said filter means for one frame, another data selector for selecting an output of said frame memory at a time of performing intraframe coding, and for selecting "0" at a time of performing intraframe coding, an adder for adding an output of said another data selector and said output of said filter means and for supplying a result to said frame memory, wherein said second raster/block converting means converts a raster image signal from said adder to a block scan signal.

6. The image signal compressing and coding apparatus according to claim 5, wherein said differentiating circuit further includes switch means for switching said output of said another data selector to an input side of said filter means when said input raster image signal is a still picture image signal.

7. The image signal compressing and coding apparatus according to claim 5, further comprising monitor means for monitoring an output of said adder.

8. The image signal compressing and coding apparatus according to claim 7, wherein said monitor means includes a digital-to-analog converter for converting said output of said adder to an analog image signal and a monitor for receiving an output of said digital-to-analog converter.

9. The image signal compressing and coding apparatus according to claim 1 further comprising S/N ratio determining means for determining an S/N ratio of an output of said differentiating circuit.

* * * * *